US010208652B2

(12) United States Patent
Maier et al.

(10) Patent No.: US 10,208,652 B2
(45) Date of Patent: Feb. 19, 2019

(54) PRE-CHAMBER OF INTERNAL COMBUSTION ENGINE

(71) Applicant: Caterpillar Energy Solutions GmbH, Mannheim (DE)

(72) Inventors: Thomas Maier, Ladenburg (DE); Enrico Drehobl, Reilingen (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 15 days.

(21) Appl. No.: 15/374,083

(22) Filed: Dec. 9, 2016

(65) Prior Publication Data

US 2017/0167358 A1   Jun. 15, 2017

(30) Foreign Application Priority Data

Dec. 14, 2015   (EP) .................................. 15199883

(51) Int. Cl.
| | |
|---|---|
| *F02B 19/10* | (2006.01) |
| *F02B 19/18* | (2006.01) |
| *F02B 19/12* | (2006.01) |
| *F02M 21/02* | (2006.01) |
| *F02D 19/06* | (2006.01) |

(52) U.S. Cl.
CPC .......... *F02B 19/1019* (2013.01); *F02B 19/12* (2013.01); *F02B 19/18* (2013.01); *F02B 19/108* (2013.01); *F02B 19/1014* (2013.01); *F02D 19/0642* (2013.01); *F02M 21/0275* (2013.01); *Y02T 10/125* (2013.01); *Y02T 10/36* (2013.01)

(58) Field of Classification Search
CPC .... F02B 19/1019; F02B 19/18; F02B 19/108; F02B 19/08; F02B 19/16
See application file for complete search history.

(56) References Cited

U.S. PATENT DOCUMENTS

| | | | | |
|---|---|---|---|---|
| 2,380,615 | A * | 7/1945 | Sheppard | F02B 19/08 123/291 |
| 4,676,209 | A * | 6/1987 | Etoh | F02B 19/18 123/262 |
| 9,695,737 | B2 * | 7/2017 | Redtenbacher | F02B 19/12 |
| 2011/0308495 | A1 * | 12/2011 | Furukawa | F02B 19/108 123/253 |

(Continued)

FOREIGN PATENT DOCUMENTS

| | | |
|---|---|---|
| DE | 3300945 | 12/1920 |
| DE | 1031574 | 6/1958 |

(Continued)

OTHER PUBLICATIONS

The Economist, 3D printing scales up, Sep. 7, 2013, https://www.economist.com/news/technology-quarterly/21584447-digital-manufacturing-there-lot-hype-around-3d-printing-it-fast.*

(Continued)

*Primary Examiner* — Erick R Solis
*Assistant Examiner* — Anthony L Bacon

(57) ABSTRACT

A pre-chamber body for an internal combustion engine is disclosed. The pre-chamber body may have a pre-chamber. The pre-chamber body may also have a flow transfer passage, which may fluidly connect the pre-chamber and an exterior of the pre-chamber body. In addition, the pre-chamber body may have at least one backflow channel, which may fluidly connect the pre-chamber and the flow transfer passage.

14 Claims, 3 Drawing Sheets

(56) References Cited

U.S. PATENT DOCUMENTS

| | | | |
|---|---|---|---|
| 2012/0125287 A1* | 5/2012 | Chiera | F02B 19/12 |
| | | | 123/254 |
| 2013/0139784 A1 | 6/2013 | Pierz | |
| 2013/0160734 A1* | 6/2013 | Redtenbacher | F02B 19/1004 |
| | | | 123/253 |
| 2013/0213347 A1 | 8/2013 | Schaumberger et al. | |
| 2015/0034044 A1 | 2/2015 | Hayes, Jr. | |
| 2016/0195003 A1* | 7/2016 | Konczol | F02B 19/12 |
| | | | 123/253 |
| 2016/0245151 A1* | 8/2016 | Yuuki | F02B 19/08 |

FOREIGN PATENT DOCUMENTS

| | | | | |
|---|---|---|---|---|
| DE | 33 00 945 | * | 7/1984 | F02B 19/12 |
| EP | 2402582 | | 10/1987 | |
| EP | 1936143 | | 6/2008 | |
| JP | S57-172121 | | 4/1956 | |
| JP | 57172121 A | * | 10/1982 | G01K 1/14 |
| JP | H06-108850 | | 4/1994 | |
| JP | 2000-205049 | | 7/2000 | |
| JP | 2004-332656 | | 11/2004 | |
| WO | WO 2014/191085 | | 12/2014 | |

OTHER PUBLICATIONS

EP Search Report dated Jun. 28, 2016, issued in EP 15199883 (2 pages).

* cited by examiner

PRE-CHAMBER OF INTERNAL COMBUSTION ENGINE

CLAIM FOR PRIORITY

This application claims benefit of priority of European Patent Application No. EP 15199883.8, filed Dec. 14, 2015, which is incorporated herein by reference.

TECHNICAL FIELD

The present disclosure generally relates to an internal combustion engine. More particularly, the present disclosure relates to a pre-chamber body for an internal combustion engine, a pre-chamber assembly for an internal combustion engine, and a method for operating an internal combustion engine including a main combustion chamber and a pre-chamber.

BACKGROUND

Gaseous fuel internal combustion engines powered with a lean mixture of gaseous fuel and air may comprise a pre-combustion chamber (also referred to as pre-chamber) per cylinder for ignition purposes. Particularly, large-bore engines may benefit from those pre-chambers as it is otherwise difficult to consistently achieve complete and thorough combustion using lean fuel air mixtures.

Typically, such a pre-chamber is fluidly connected to a main combustion chamber of a respective cylinder via a flow transfer passage including a riser channel and a plurality of flow transfer channels. The flow transfer passages allows the flow of the lean mixture of gaseous fuel and air from the main combustion chamber into the pre-chamber during a compression stroke via the flow transfer channels and the riser channel. Enrichment of the lean mixture in the pre-chamber may be effected by providing a small quantity of (gaseous) fuel into the pre-chamber via a separate fuel feed passage, for example during the intake stroke. The enriched mixture is ignited in the pre-chamber by an igniter such as a spark plug. The ignition of the enriched mixture causes a flame front of hot gases that propagates from the pre-chamber via the flow transfer passage into the main combustion chamber. Thus, the lean mixture in the main combustion chamber ignites and burns, and thereby, expands against a movable piston that drives a crankshaft.

For example, US 2013/0160734 A1 discloses a pre-chamber system for an internal combustion engine. The pre-chamber system has a pre-chamber, a fuel introduction device, and a dead space which connects the fuel introduction device to the pre-chamber. A channel is provided which connects the pre-chamber to the dead space so that the dead space can be flushed to avoid rich zones in the dead space and hence the formation of soot particles.

The present disclosure is directed, at least in part, to improving or overcoming one or more aspects of prior systems.

SUMMARY OF THE DISCLOSURE

In one aspect, the present disclosure relates to a pre-chamber body for an internal combustion engine. The pre-chamber body may comprise a pre-chamber, a flow transfer passage fluidly connecting the pre-chamber and an exterior of the pre-chamber body. The pre-chamber body may comprise at least one backflow channel fluidly connecting the pre-chamber and the flow transfer passage.

In another aspect, the present disclosure relates to a pre-chamber assembly. The pre-chamber assembly may comprise a pre-chamber body as exemplary disclosed herein. The pre-chamber assembly may comprise an ignition device operably coupled to the pre-chamber to ignite a mixture therein, and a fuel supply device fluidly connected to the pre-chamber to supply fuel.

In yet another aspect, the present disclosure relates a method for operating an internal combustion engine including a main combustion chamber and a pre-chamber. The method may comprise supplying a mixture of fuel and air from the main combustion chamber into the pre-chamber via a flow transfer passage fluidly connecting the pre-chamber and the main combustion chamber. The method may further comprise supplying a fuel into the pre-chamber, and thereby, enriching the mixture in the pre-chamber by mixing the mixture from the main combustion chamber and the fuel. The method may comprise supplying a portion of the enriched mixture from the pre-chamber into the flow transfer passage via at least one backflow channel, and thereby, enriching the mixture in the flow transfer passage by mixing the mixture from the main combustion chamber and the enriched mixture from the pre-chamber.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
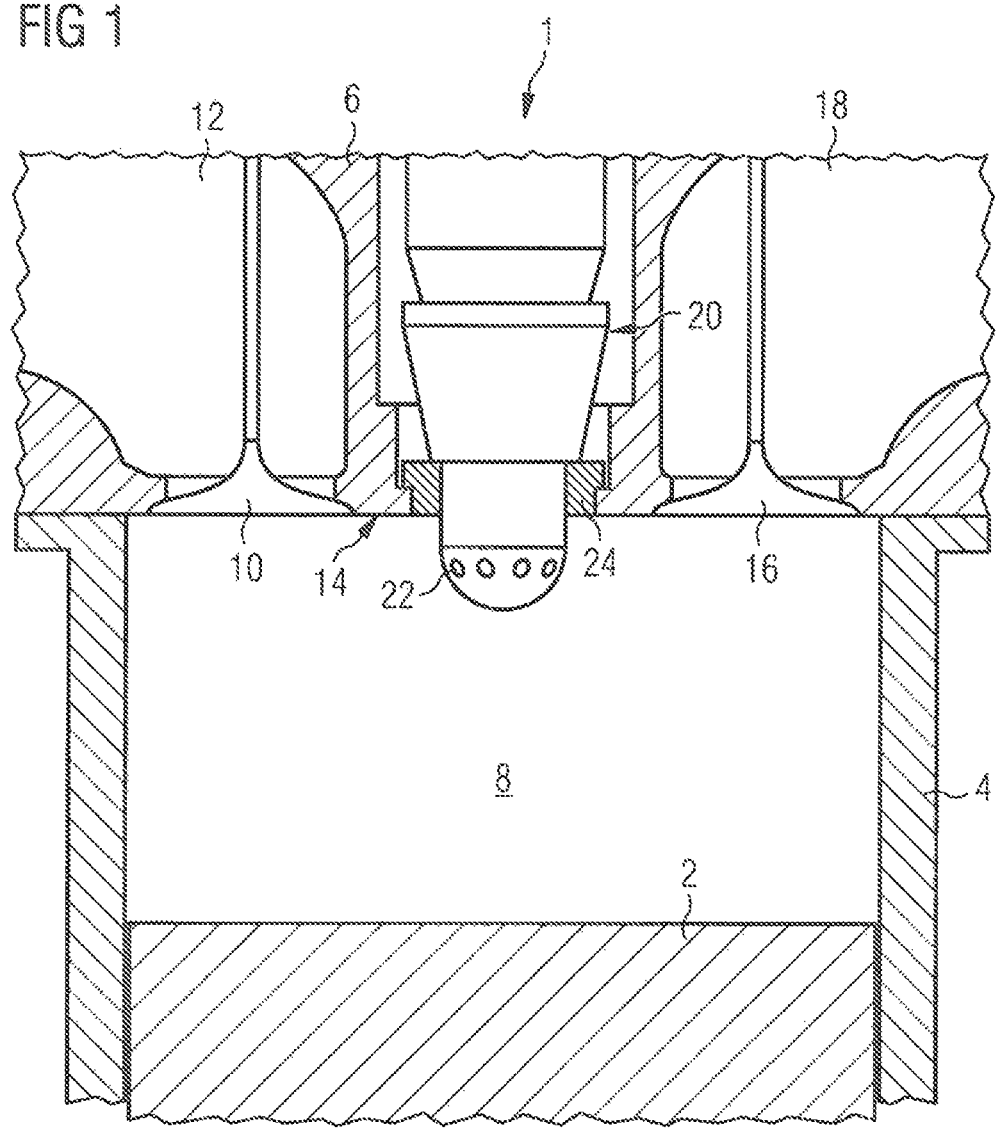
FIG. 1 shows a schematic cut view through a portion of an internal combustion engine that is equipped with a pre-chamber body according to the present disclosure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that an air-fuel ratio (AFR) distribution within the pre-chamber is inhomogeneous at ignition time in conventional pre-chambers which are flushed with gaseous fuel. Particularly, an upper region of the pre-chamber where fuel or a rich mixture of fuel and air is directly supplied via a fuel supply device has a lower AFR than a lower region of the pre-chamber and the flow transfer passage connecting the pre-chamber with the main combustion chamber. In other words, the upper region is filled with a richer mixture than the lower region of the pre-chamber and the flow transfer passage at the ignition time. Said inhomogeneity in the AFR distribution results in a deterioration of the combustion velocity and emission formation.

Accordingly, herein it is suggested to include backflow or recirculation channels in a pre-chamber body. The backflow channels are configured to create a backflow from the pre-chamber into the flow transfer passage due to a pressure difference. The return flow improves the mixing within the pre-chamber and the flow transfer passage, and thereby, homogenizes the AFR distribution within the pre-chamber and the flow transfer passage.

Referring now to the drawings to explain the general principle of the present disclosure by way of example. FIG. 1 depicts a piston 2 arranged in a cylinder 4 of a portion of an internal combustion engine 1 (not shown in further detail). The cylinder 4 is covered by a cylinder head 6. The piston 2, the cylinder 4, and the cylinder head 6 together define a main combustion chamber 8 of the internal combustion engine 1. The piston 2 is reciprocatingly arranged in the cylinder 4 to move between a top dead center (TDC) and a bottom dead center (BDC) during operation of the internal combustion engine 1.

For the purpose of describing exemplary embodiments of the present disclosure, the internal combustion engine 1 is considered as a four-stroke internal combustion engine operating at least partly on gaseous fuel such as a gaseous fuel engine or a dual fuel engine. One skilled in the art will appreciate, however, that the internal combustion engine may be any type of engine (turbine, gas, diesel, natural gas, propane, two-stroke, etc.) that would utilize the pre-chamber assembly as disclosed herein. Furthermore, the internal combustion engine may be of any size, with any number of cylinders, and in any configuration (V-type, in-line, radial, etc.). Moreover, the internal combustion engine may be used to power any machine or other device, including locomotive applications, on-highway trucks or vehicles, off-highway trucks or machines, earth moving equipment, generators, aerospace applications, marine applications, pumps, stationary equipment, or other engine powered applications.

The cylinder head 6 includes at least one inlet valve 10, for example a poppet valve. The inlet valve 10 is accommodated in an inlet channel 12 opening in a piston sided face 14 of the cylinder head 6 for supplying a (lean) mixture of gaseous fuel and air or air only into the main combustion chamber 8. Similarly, at least one outlet valve 16, for example also a poppet valve, is accommodated in an outlet channel 18 of the cylinder head 6 to guide exhaust gas out of the main combustion chamber 8.

The cylinder head 6 further comprises a pre-chamber assembly 20. A plurality of flow transfer channels 22 fluidly connect the main combustion chamber 8 with a riser channel and a pre-chamber (both not visible in FIG. 1) within the pre-chamber assembly 20.

The pre-chamber assembly 20 is installed in the cylinder head 6 via a mounting body 24 as shown in FIG. 1. Alternatively, the pre-chamber assembly 20 may be installed in the cylinder head 6 in any other fashion.

Figure 2:
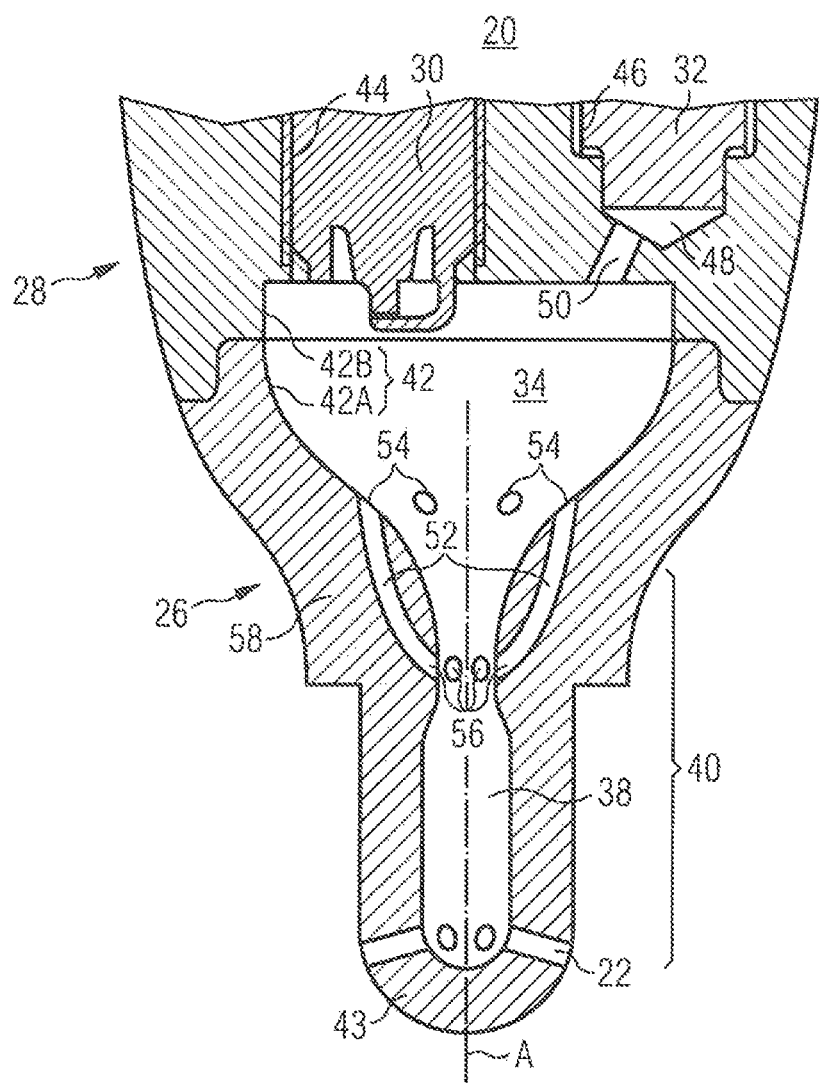
FIG. 2 shows a schematic cut view through an exemplary pre-chamber assembly according to the present disclosure.

Referring to FIG. 2, a first embodiment of a pre-chamber assembly 20 is shown in a schematic sectional view.

The pre-chamber assembly 20 includes a first pre-chamber body 26, a second pre-chamber body 28, an ignition device 30, and a fuel supply device 32. The first pre-chamber body 26 and the second pre-chamber body 28 are connected to one another. The ignition device 30 and the fuel supply device 32 are accommodated in the second pre-chamber body 28.

The first pre-chamber body 26 includes and defines a pre-chamber or pre-chamber main portion 34, a riser channel 38 and the flow transfer channels 22. The riser channel 38 and the flow transfer channels 22 together form a flow transfer passage 40. The flow transfer passage 40 connects the pre-chamber 34 with an exterior of the first pre-chamber body 26. In an assembled state, the flow transfer passage 40 connects the pre-chamber 34 and the main combustion chamber 8 (FIG. 1).

As can be seen in FIG. 2, a diameter of the pre-chamber 34 is greater than a diameter of the riser channel 38 which in turn is greater than a diameter of the flow transfer channels 22.

The pre-chamber or main (upper) pre-chamber volume 34 is defined by an inner pre-chamber face 42 of the first pre-chamber body 26. The inner pre-chamber face 42 includes a first section 42A formed in the first pre-chamber body 26, and a second section 42B formed in the second pre-chamber body 28. In the shown embodiment, the first section 42A is a circumferential face concentrically disposed around a pre-chamber longitudinal axis A.

The pre-chamber 34 extends along the longitudinal axis A of the first pre-chamber body 26, is funnel-shaped, and tapers in direction to the riser channel 38. Alternatively, the pre-chamber 34 may have any other shape such as a cylindrical shape, pyramidal shape, conical shape, and combinations thereof. For example, the pre-chamber 34 may have a volume within a range between 0.1% and 10% of the compression volume of the cylinder 4 (see FIG. 1).

A bottom section of the pre-chamber 34 smoothly transitions into the riser channel 38. The riser channel 38 longitudinally extends in the first pre-chamber body 26, and opens with one end in the pre-chamber 34. In the shown configuration of FIG. 2, the riser channel 38 is aligned with the pre-chamber longitudinal axis A. Alternatively, the riser channel 38 may run parallel to the pre-chamber longitudinal axis A, or may confine an angle with the pre-chamber longitudinal axis A. The riser channel 38 fluidly connects the pre-chamber 34 and the flow transfer channels 22.

To fluidly connect a bottom section of the riser channel 38 and a top section of the main combustion chamber 8 (see FIG. 1), the flow transfer channels 22 are provided. The flow transfer channels 22 extend through a tip portion 43 of the first pre-chamber body 26 in a curved or straight manner.

In some embodiments, the flow transfer channels 22 may directly open in the pre-chamber 34. In other words, a riser channel fluidly interconnected between the pre-chamber and the flow transfer channels may be omitted.

The ignition device 30, for example a spark plug, a laser or plasma igniter, an ignition fuel injector, or a glow plug, is installed in the pre-chamber assembly 20 so that the ignition device 30 is operably coupled to the pre-chamber 34.

As used herein, "operably coupled" means that the ignition device 30 is—depending on its ignition mechanism—configured and arranged to ignite an ignitable mixture in the pre-chamber 34. For example, in case the ignition device 30 is a spark plug, the same may extend into the pre-chamber 34. Specifically, electrodes of the spark plug may reach into the pre-chamber 34 so that a spark between the electrodes ignites a mixture in the pre-chamber 34. As another example, in case the ignition device 30 is a laser igniter, the same may be separated from the pre-chamber 34 via a window that is configured to transmit a laser beam from the laser igniter into the pre-chamber 34.

In case the ignition device 30 is configured as an igniter that reaches into the pre-chamber 34 (as is exemplary shown in FIG. 2), the ignition device 30 may be mounted in the first or second pre-chamber body 26, 28 to extend through an ignition device bore 44.

The fuel supply device 32 is mounted in a fuel supply bore 46 extending through the second pre-chamber body 28. Alternatively, the fuel supply device 32 may be mounted in the first pre-chamber body 26.

The fuel supply device 32 is configured to supply a fuel, for example a gaseous fuel, or a rich mixture of fuel and air into a dead space 48 that is fluidly connected to the pre-chamber 34 via a fuel supply channel 50. The fuel supply channel 50 opens in a top region of the pre-chamber 34 near the ignition device 30 to supply the fuel from the fuel supply device 32 into the pre-chamber 34.

In some embodiments, the fuel supply device may directly reach into the pre-chamber 34. In other words, the dead space in front of the fuel supply device and the fuel supply channel may be omitted.

The first pre-chamber body 26 further includes a plurality of backflow or recirculation channels 52. The backflow channels 52 each extend between a pre-chamber opening 54 and a riser channel opening 56 to fluidly connect the pre-chamber 34 and the riser channel 38. The pre-chamber openings 54 are provided in a tapered section of the pre-chamber 34. Alternatively or additionally, the pre-chamber openings 54 may be disposed in a section of the pre-chamber 34 having a constant diameter.

The backflow channels 52 are disposed in a pre-chamber wall 58 extending circumferentially about the pre-chamber longitudinal axis A. For example, the backflow channels may be symmetrically provided about the pre-chamber longitudinal axis A as shown in FIG. 2.

In some embodiments, for example the embodiment shown in FIG. 2, the riser channel 38 includes a venturi constriction (a decrease in diameter followed by an increase in diameter). The riser passage openings 56 are disposed in the venturi constriction of the riser channel 38 to form a so-called venturi tube as one skilled in the art will appreciate.

For example, a number of the backflow channels 52 may be within a range between 1 and 16, particularly within a range between 4 and 8.

In the shown embodiment, the backflow channels 52 have a curved shape. In other embodiments, the backflow channels may have a straight shape, for example to allow drilling of the backflow channels 52.

Figure 3:
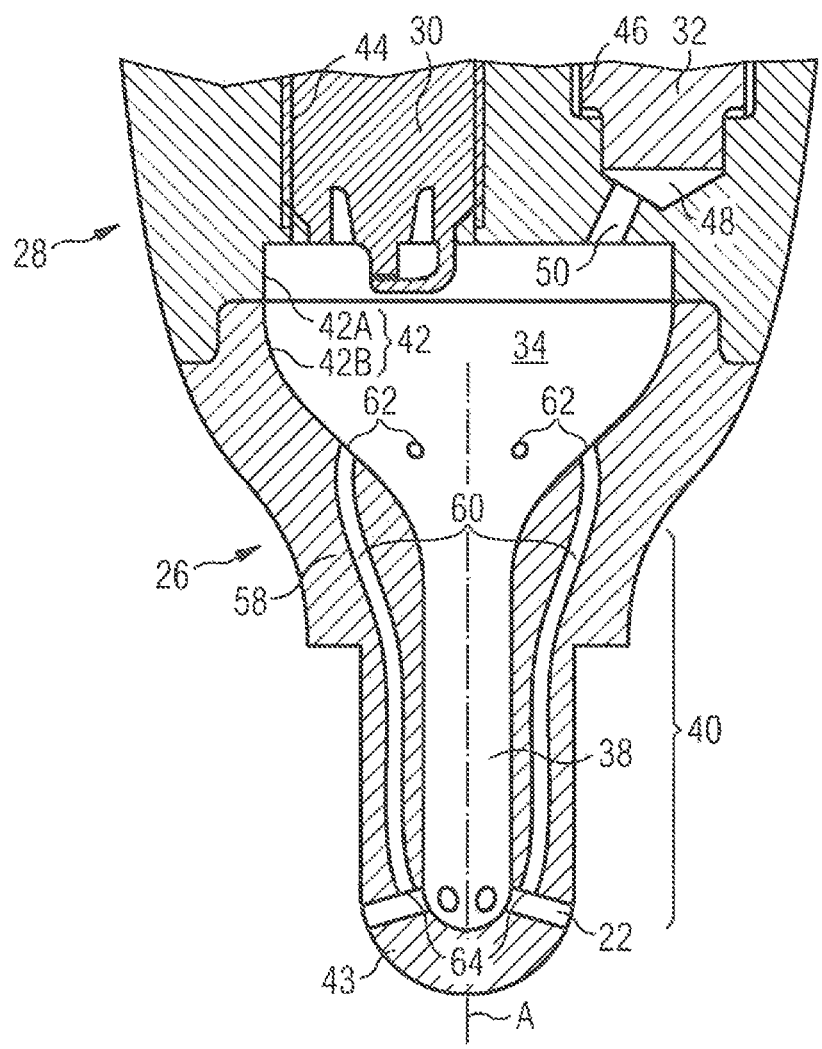
FIG. 3 shows a schematic cut view through another exemplary pre-chamber assembly according to the present disclosure.

Referring to FIG. 3, another exemplary embodiment of the first pre-chamber body 26 is shown. The first pre-chamber body 26 of FIG. 3 is similar to the first pre-chamber body 26 of FIG. 2 mainly except the configuration of the backflow channels.

Here, a plurality of backflow or recirculation channels 60 extend between a pre-chamber opening 62 and a flow transfer channel opening 64 to fluidly connect the pre-chamber 34 and the flow transfer channels 22. Similar to the embodiment shown in FIG. 2, the backflow channels 60 are provided symmetrically about the pre-chamber longitudinal axis A in the pre-chamber wall 58, and the pre-chamber openings 62 are provided in the tapered section of the pre-chamber 34. In other embodiments, the backflow channels 60 may be provided in another fashion, for example asymmetrically about the pre-chamber longitudinal axis A, for example to influence an AFR in the vicinity of the ignition device 30.

In some embodiments, the flow transfer channels 22 may include a venturi constriction to form a venturi tube together with the flow transfer channel openings 64 being arranged in the vicinity of the venturi constriction.

In some embodiments, the first pre-chamber body 26 may include both the backflow channels 52 opening in the riser passage 38, and the backflow channels 60 opening in the flow transfer channels 22. For instance, the backflow channels 52 and the backflow channels 60 may be arranged alternately to each other in a circumferential direction about the pre-chamber longitudinal axis A.

INDUSTRIAL APPLICABILITY

The pre-chamber as exemplary disclosed herein is particularly applicable in a stationary or marine large-bore gaseous fuel internal combustion engine operating on a lean fuel mixture. However, one skilled in the art will appreciate, that other internal combustion engines may be equipped with the pre-chamber is disclosed herein as well.

In the following, operation of the internal combustion engine 1 in conjunction with the functionality of the pre-chamber assembly 20 is described.

During operation of the internal combustion engine 1, a mixture of fuel and air, for example a lean mixture of fuel and air, enters the pre-chamber 34 from the main combustion chamber 8. Specifically, the mixture of fuel and air passes through the flow transfer passage 40, particularly the flow transfer channels 22 and the riser channel 38, into the pre-chamber 34.

Additionally, a rich mixture of fuel and air or fuel only, for example gaseous fuel, is supplied into the pre-chamber 34 via the fuel supply device 32. Specifically, the fuel supply device 32 supplies fuel (and optionally air) into the dead space 48, which flows into an upper section of the pre-chamber 34. The fuel mixes with the mixture from the main combustion chamber 8, and thereby generates an ignitable enriched mixture in the pre-chamber 34, particularly in front of the spark plug 30.

However, the fuel concentration (AFR distribution) may be not homogeneous across the pre-chamber 34, the riser channel 38, and the flow transfer channels 22.

The pre-chamber body 26 as disclosed herein allows that a portion of the enriched mixture from the pre-chamber 34 flows into the flow transfer passage(s) 40 via the backflow channels 52 and 60. For example, the enriched mixture may enter the inlet openings 54 of the backflow channels 52, flow through the backflow channels 52, and exit the backflow channels 52 through the outlet openings 56 into the riser channel 38. Alternatively or additionally, for example, the enriched mixture may enter the inlet openings 62 of the backflow channels 60, flow through the backflow channels 60, and exit of the backflow channels 60 through the outlet openings 64 into the flow transfer channels 22. The backflow of the enriched mixture causes a recirculation within the first pre-chamber body 26, and thus increases the fuel concentration in regions of the pre-chamber assembly 20 far away from the fuel supply device 32, for example in the fuel transfer channels 22 and the riser channel 38. Additionally, the backflow into the flow transfer passage 40 improves the mixing, and hence, the homogeneity with respect to fuel concentration and/or AFR-distribution inside of the pre-chamber assembly 20.

The backflow into the flow transfer passage 40 is facilitated by a pressure difference between the pre-chamber 34 and the flow transfer passage 40. Specifically, the pre-chamber 34 has a higher static pressure than the flow transfer passage 40, because the flow velocity in the flow transfer passage 40 is higher due to the reduced flow cross sectional area of the flow transfer passage 40, particularly the flow transfer channels 22 and the riser channel 38.

Additionally, the backflow into the flow transfer passage 40 may be increased if providing the backflow channel outlets 56 and/or 64 in a venturi constriction of the riser channel 38 and the flow transfer channels 22, respectively, to form a venturi tube (see FIG. 2). The venturi tube further reduces the pressure in the region of the backflow channel outlets 56 and/or 64, which further increases the pressure difference between the opposing openings 54, 56 and 62, 64, respectively. As a result, the enriched mixture from the pre-chamber 34 is drawn faster into the flow transfer passage 40 via the backflow channels 52 and 60 due to a venturi effect.

For increasing the homogenization of the AFR distribution, in some embodiments, a plurality of backflow channels 52 and/or 60 may be provided in a circumferential direction about the pre-chamber axis A, for example evenly distributed in the circumferential direction about the pre-chamber axis A.

The pre-chamber body 26 and/or 28 may be fabricated by drilling, eroding, casting, 3D sintering, 3D printing (additive manufacturing) and/or other suitable methods known in the art.

A 3D printing process for manufacturing the pre-chamber body 26 and/or 28 may include, among others, fused deposition modeling (FDM), fused filament fabrication (FFF), robocasting, direct ink writing (DIW), stereolithography (SLA), digital light processing (DLP), powder bed and inkjet head 3D printing (3DP, electron-beam melting (EBM), selective laser melting (SLM), selective heat sintering (SHS), selective laser sintering (SLS), direct metal laser sintering (DMLS), laminated object manufacturing (LOM), and/or electron beam freeform fabrication (EBF3).

Terms such as "about", "around", "approximately", or "substantially" as used herein when referring to a measurable value such as a parameter, an amount, a temporal duration, and the like, is meant to encompass variations of +/−10% or less, preferably +1−5% or less, more preferably +1/−1% or less, and still more preferably +1/−0.1% or less of and from the specified value, insofar as such variations are appropriate to perform in the disclosed invention. It is to be understood that the value to which the modifier "about" refers is itself also specifically, and preferably, disclosed. The recitation of numerical ranges by endpoints includes all numbers and fractions subsumed within the respective ranges, as well as the recited endpoints.

Although the preferred embodiments of this invention have been described herein, improvements and modifications may be incorporated without departing from the scope of the following claims.

The invention claimed is:

1. A pre-chamber body for an internal combustion engine, the pre-chamber body comprising:
    a wall having a thickness extending from an internal surface of the pre-chamber body to an external surface of the pre-chamber body,
    the internal surface defining a pre-chamber and a flow transfer passage within the pre-chamber body, the flow transfer passage including a venturi constriction,
    the external surface defining a flow transfer outlet aperture therethrough, the pre-chamber being in fluid communication with the flow transfer outlet aperture via the flow transfer passage,
    the wall defining at least one backflow channel extending from a first backflow aperture to a second backflow aperture, the first backflow aperture and the second backflow aperture each being defined by the internal surface,
    the first backflow aperture being located in the pre-chamber, and the second backflow aperture being located in the venturi constriction, such that a fluid flow from the flow transfer outlet aperture toward the pre-chamber generates a pressure at the second backflow aperture that is less than a pressure at the first backflow aperture, thereby effecting a flow of fluid from the pre-chamber to the venturi constriction via the at least one backflow channel.

2. The pre-chamber body of claim 1, wherein the at least one backflow channel comprises a plurality of backflow channels disposed in a circumferential direction about a pre-chamber longitudinal axis (A).

3. The pre-chamber body of claim 1, wherein the flow transfer passage further includes a riser channel and a plurality of flow transfer channels, the riser channel opening in the pre-chamber, and the plurality of flow transfer channels fluidly connecting the riser channel with the external surface of the pre-chamber body.

4. The pre-chamber body of claim 3, wherein the pre-chamber has a pre-chamber diameter, and the riser channel has a riser channel diameter, and the riser channel diameter is smaller than the pre-chamber diameter.

5. The pre-chamber body of claim 1, wherein the flow transfer passage further includes a flow transfer channel extending from a flow transfer inlet aperture to the flow transfer outlet aperture, the flow transfer inlet aperture being defined by the internal surface, and
    the flow transfer channel includes the venturi constriction.

6. The pre-chamber body of claim 5, wherein the pre-chamber has a pre-chamber diameter, and the flow transfer channel has a flow transfer channel diameter, and the flow transfer channel diameter is smaller than the pre-chamber diameter.

7. The pre-chamber body of claim 1, wherein the pre-chamber has a tapered section that tapers in a direction toward the flow transfer passage, and
    the first backflow aperture is located along the tapered section of the pre-chamber.

8. The pre-chamber body of claim 1, further comprising a fuel supply channel opening in the pre-chamber, the fuel supply channel being in fluid communication with the flow transfer passage via the pre-chamber.

9. The pre-chamber body of claim 1, wherein the pre-chamber body is manufactured by a three-dimensional (3D) printing process.

10. A method for operating an internal combustion engine including a main combustion chamber and a pre-chamber, the method comprising:
    flowing a mixture of main fuel and air from the main combustion chamber into the pre-chamber via a flow transfer passage fluidly connecting the pre-chamber and the main combustion chamber, the flow transfer passage including a venturi constriction;
    supplying an enrichment fuel into the pre-chamber to generate an enriched mixture in the pre-chamber by mixing the mixture of main fuel and air from the main combustion chamber and the enrichment fuel;
    generating a static pressure in the venturi constriction that is less than a static pressure in the pre-chamber, as a result of a venturi effect in the venturi constriction, by the flowing the mixture of main fuel and air through the venturi constriction toward the pre-chamber;

drawing a flow of the enriched mixture from the pre-chamber into the flow transfer passage via at least one backflow channel by the venturi effect in the venturi constriction, the at least one backflow channel extending from a first backflow aperture through an internal surface of the pre-chamber to a second backflow aperture through an internal surface of the venturi constriction; and enriching a fuel concentration in the flow transfer passage by mixing the mixture of main fuel and air from the main combustion chamber and the enriched mixture from the pre-chamber drawn through the at least one backflow channel by the venturi effect.

11. An engine comprising:

a piston disposed in sliding contact with a cylinder wall, the piston and the cylinder wall at least partly defining a main combustion chamber;

a pre-chamber body including a wall having a thickness extending from an internal surface of the pre-chamber body to an external surface of the pre-chamber body, the internal surface defining a pre-chamber and a flow transfer passage within the pre-chamber body, the wall defining a flow transfer channel extending from a flow transfer inlet aperture to a flow transfer outlet aperture, the flow transfer inlet aperture being defined by the internal surface, the flow transfer outlet aperture being defined by the external surface, the pre-chamber being in fluid communication with the main combustion chamber via the flow transfer outlet aperture, the wall further defining at least one backflow channel extending from a first backflow aperture to a second backflow aperture, the first backflow aperture being defined by the internal surface and being located in the pre-chamber, the second backflow aperture being located along the flow transfer channel;

an ignition device operably coupled to the pre-chamber to ignite a mixture therein; and a fuel supply device fluidly connected to the pre-chamber to supply fuel, the fuel supply device being in fluid communication with the flow transfer passage via the pre-chamber.

12. The engine of claim 11, wherein the at least one backflow channel comprises a plurality of backflow channels disposed in a circumferential direction about a pre-chamber longitudinal axis.

13. The engine of claim 11, wherein the flow transfer passage further includes a riser channel and a plurality of flow transfer channels, the riser channel opening in the pre-chamber, and the plurality of flow transfer channels fluidly connecting the riser channel with the external surface of the pre-chamber body.

14. The engine of claim 13, wherein the pre-chamber has a pre-chamber diameter, and the riser channel has a riser channel diameter, and the riser channel diameter is smaller than the pre-chamber diameter.

* * * * *